United States Patent Office 3,544,571
Patented Dec. 1, 1970

3,544,571
PROCESS FOR MAKING PYRAZINOYL-
THIOUREA COMPOUNDS
Edward J. Cragoe, Jr., Lansdale, and Kenneth L. Shepard, Ambler, Pa., assignors to Merck & Co., Inc., Rahway, N.J., a corporation of New Jersey
No Drawing. Filed Sept. 4, 1968, Ser. No. 757,492
Int. Cl. C07d 51/76
U.S. Cl. 260—250       11 Claims

ABSTRACT OF THE DISCLOSURE

Pyrazinoylthioureas and a process for their preparation are described which process comprises treating a pyrazinoylcyanamide with hydrogen sulfide. The products are diuretic and/or saluretic agents.

---

This invention relates to pyrazinoylthioureas and a process for their preparation. More particularly it relates to 3-amino-5-R-6-$R^1$-pyrazinoylthioureas and a process for their preparation from 3-amino-5-R-6-$R^1$-pyrazinoyl-cyanamides. The compounds of this invention are represented by the following structural formula:

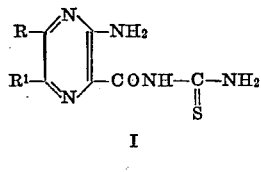

I wherein R represents
(1) hydrogen,
(2) trifluoromethyl,
(3) lower cycloalkyl of from 3 to 6 carbon atoms such as cyclopropyl, cyclopentyl or cyclohexyl,
(4) mononuclear aryl, such as phenyl,
(5) lower alkyl, of from 1 to about 5 carbon atoms, either straight or branched chain, such as methyl, ethyl, propyl, butyl, or pentyl, or
(6) amino, of structure —$NR^3R^4$, wherein $R^3$ represents (a) hydrogen, (b) lower alkyl of from 1 to about 3 carbon atoms such as methyl, ethyl or propyl, and $R^4$ represents (a) hydrogen, (b) amino, (c) lower cycloalkyl of from 3 to about 6 carbon atoms such as cyclopropyl, cyclopentyl or cyclohexyl, (d) mononuclear aryl such as phenyl, (e) lower alkenyl of from 3 to about 6 carbon atoms such as allyl, (f) lower alkyl of from 1 to about 5 carbon atoms either straight or branched chain, and either unsubstituted or substituted with such as (1) hydroxy, (2) amino, (3) di(lower alkyl)amino, wherein the lower alkyl groups have from 1 to about 3 carbon atoms such as methyl, ethyl, or propyl, (4) halo, such as fluoro or chloro, (5) mononuclear aryl, such as phenyl, (6) lower cycloalkyl of from 3 to about 6 carbon atoms, such as cyclopropyl, cyclopentyl, or cyclohexyl, (7) heterocyclic, such as pyridyl or furyl, and when $R^3$ and $R^4$ each represents lower alkyl, they can be linked together either directly or through a nitrogen atom to form with the nitrogen atom to which they are attached a heterocyclic ring such as pyrrolidinyl, hexahydro-1-azepinyl, or N-methyl-piperazinyl;

$R^1$ represents
(1) hydrogen,
(2) halo, such as chloro, bromo or iodo,
(3) lower alkyl of from 1 to about 3 carbon atoms, such as methyl, ethyl or propyl,
(4) lower cycloalkyl of from 3 to about 6 carbon atoms, such as cyclopropyl, cyclopentyl or cyclohexyl,
(5) mononuclear aryl, such as phenyl; and R and $R^1$ can be linked together to form a group such as —CH=CH—CH=CH—, —CH=CH—CCl=CH— or —$(CH_2)_4$—.

The novel compounds of this invention possess diuretic and saluretic properties and can be administered either alone or in the form of pills, capsules, tablets and the like or admixed with antihypertensive or other therapeutically effective compounds in a single dosage form. The compounds are effective in enhancing the excretion of sodium and chloride ions and are therefore useful natriuretic agents in the treatment of conditions resulting from an excessive accumulation of sodium chloride in the body. While the dosage of the compounds will vary from compound to compound, and also upon the age and condition of the patient, an average dosage of about 50 mg. or more or less of the novel compounds of this invention generally is effective in lowering the sodium chloride concentration of the blood. This dosage is well below their toxic dose and the compounds therefore are safe drugs for use in therapy of this type.

The process of the present invention is illustrated by the following equation:

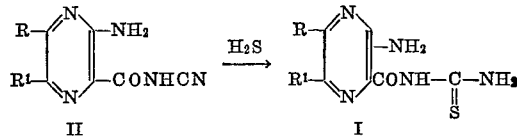

II                I wherein R and $R^1$ have the meanings assigned above. The reaction is conducted in an inert solvent for the 3-amino-5-R-6-$R^1$-pyrazinoylcyanamide (II), preferably a water miscible solvent for ease of isolation, such as pyridine, dimethylformamide, dimethyl sulfoxide, dimethyl sulfone, or the like, in the presence of about a molar equivalent of a tri(lower alkyl)amine wherein each lower alkyl group has from 1 to 5 carbons such as in trimethylamine, triethylamine, tripropylamine or the like. To this solution is added gaseous hydrogen sulfide preferably below the surface of the reaction mixture between about ambient temperature and about 100° C. at least until one molar equivalent of hydrogen sulfide is consumed and usually for from 1 to about 3 hours to insure the presence of an excess. If the hydrogen sulfide is added at ambient temperature, completion of the reaction is assured by finally heating at about steam bath temperature for about 1 to 2 hours. After cooling, the product is conveniently isolated by diluting the reaction mixture with water and collecting the precipitated pyrazinoylthiourea.

The pyrazinoylcyanamide starting materials (II) are prepared from esters of pyrazinoic acids, according to the following equation:

II

The process comprises dissolving cyanamide in an anhydrous lower alkanol, such as methanol, ethanol or propanol containing approximately an equivalent amount of an alkali metal such as sodium or potassium. After one-half to about one hour at a temperature between ambient and reflux, solid pyrazinoic acid ester is added and the mixture is refluxed for from 2 to about 24 hours, during which time a solid separates. This is collected by filtration, dissolved in water and the solution is made slightly acid by addition of an acid such as hydrochloric, hydrobromic, sulfuric, acetic, propionic acid or the like. Purification by recrystallization provides the intermediate product (II).

The examples which follow demonstrate the preparation of pyrazinoylthioureas by the process of this invention as well as the preparation of the intermediate pyrazinoylcyanamides. It is to be understood that the invention is not limited to the reagents and conditions employed in the specific examples but extends to reasonable variations thereof cognizable in the art.

(A) PREPARATION OF PYRAZINOYL CYANAMIDES

Preparation 1A (3,5-diamino-6-chloropyrazinoyl)cyanamide.—Cyanamide (13.6 g., 0.324 mole) is dissolved in a solution of sodium (7.6 g., 0.324 mole) in absolute methanol (525 ml.). This solution is refluxed for one-half hour and methyl 3,5-diamino-6-chloropyrazinoate (22.0 g., 0.10 mole) is added. Refluxing is continued for twenty-four hours and the solid that separates during this time is collected by filtration. The solid is dissolved in warm water (750 ml.), treated with decolorizing carbon and filtered. The filtrate is acidified to congo red paper by the addition of dilute hydrochloric acid and the (3,5-diamino-6-chloropyrazinoyl) cyanamide that precipitates is collected and dried; yield 11.5 g. (50% yield), M.P. >330° C.

Analysis.—Calc. for $C_6H_5ClN_6O$ (percent): C, 33.89; H, 2.37; N, 39.53. Found (percent): C, 33.94; H, 2.50; N, 39.48.

Preparation 2A (3-aminopyrazinoyl)cyanamide.—Cyanamide (5.04 g., 0.12 mole) is dissolved in a solution of sodium (2.76 g., 0.12 mole) in absolute methanol (150 ml.) and stirred for one-half hour at reflux temperature. Methyl 3-aminopyrazinoate (6.12 g., 0.04 mole) is added and the mixture is refluxed for two hours. The solid that separates is collected by filtration and dissolved in water (200 ml.). Acidification by the addition of glacial acetic acid (10 ml.) gives 4.96 g. (75%) of nearly white (3-aminopyrazinoyl)cyanamide, M.P. 225–235° C. (dec.). Reprecipitation of this solid from dilute ammonium hydroxide by the addition of glacial acetic acid gives material which undergoes gradual decomposition starting at 210° C.

Analysis.—Calc. for $C_6H_5N_5O$ (percent): C, 44.17; H, 3.09; N, 42.93. Found (percent): C, 44.11; H, 3.26; N, 42.91.

Preparation 3A (3-amino-6-chloropyrazinoyl)cyanamide.—Sodium (1.9 g., 0.081 mole) is dissolved in absolute methanol (125 ml.) and cyanamide (3.4 g., 0.081 moles) is added. The resulting solution is refluxed with stirring for one-half hour. Methyl 3-amino-6-chloropyrazinoate (5.00 g., 0.027 moles) is added and the reaction mixture is refluxed for another two hours. The precipitated solid is then collected by filtration, dissolved in water (200 ml.), and the resulting solution is acidified with 6 N hydrochloric acid (5 ml.). The yellow solid which precipitates is collected and dried; yield 3.5 g. (67%), M.P. 180–183° C. (dec.) with effervescence. Recrystallization from toluene yields yellow crystals of (3-amino-6-chloropyrazinoyl cyanamide, M.P. 182–184° C. (dec.) with effervescence.

Analysis.—Calc. for $C_6H_4ClN_5O$ (percent): C, 36.47; H, 2.04; N, 35.45. Found (percent): C, 36.80; H, 2.25; N, 35.37.

Preparation 4A (3-amino-5-dimethylamino-6-chloropyrazinoyl)cyanamide.—Cyanamide (5.04 g., 0.12 mole) is dissolved in a solution of sodium (2.76 g., 0.12 mole) in absolute methanol (150 ml.) and stirred for one-half hour at room temperature. Methyl 3-amino-5-dimethylamino-6-chloropyrazinoate (9.22 g., 0.04 mole) is added and the solution refluxed for twenty-four hours. The solid that separates is collected by filtration and dissolved in water (100 ml.). The solution is acidified by the addition of glacial acetic acid and the solid that precipitates is collected and dried; yield 2.67 g. (28%), M.P. 193–197° C. (dec.). Recrystallization from isopropyl alcohol gives yellow needles of (3-amino-5-dimethylamino-6-chloropyrazinoyl)cyanamide, M.P. 194–196° C. (dec.).

Analysis.—Calc. for $C_8H_9ClN_6O$ (percent): C, 39.92; H, 3.77; N, 34.92. Found (percent): C, 40.27; H, 3.90; N, 34.96.

Preparation 5A 3-amino-5-ethylamino-6-chloropyrazinoyl)cyanamide. —Sodium (2.76 g., 0.12 mole) is dissolved in absolute methanol (150 ml.) and cyanamide (5.04 g., 0.12 mole) is added. The resulting solution is stirred at room temperature for one-half hour. Methyl 3-amino-5-ethylamino-6-chloropyrazinoate (9.24 g., 0.04 mole) is added and the reaction mixture is refluxed with stirring for twenty-one hours. The methanol is evaporated under reduced pressure, the residue is taken up in water (200 ml.), filtered, and the filtrate is acidified with 6 N hydrochloric acid (21 ml.). The yellow solid which precipitates is collected and dried, yield 7.0 g. (73%), M.P. >300° C. Recrystallization from acetonitrile gives light yellow (3-amino-5-ethylamino-6-chloropyrazinoyl)cyanamide, melting at >300° C.

Analysis.—Calc. for $C_8H_9ClN_8O$ (percent): C, 39.92; H, 3.77; N, 34.92. Found (percent): C, 40.11; H, 3.90; N, 34.90.

Preparation 6A (3-amino-5-methylamino-6-chloropyrazinoyl) cyanamide.—Cyanamide (12.6 g. 0.30 mole) is dissolved in a solution of sodium (6.9 g., 0.30 mole) in absolute methanol (750 ml.) and stirred for one-half hour at room temperature. Methyl 3-amino-5-methylamino-6-chloropyrazinoate (21.7 g., 0.10 mole) is added and the resulting solution is refluxed overnight. The solvent is evaporated under reduced pressure. The residue is diluted with water (500 ml.), some insoluble material is filtered off and the filtrate is acidified with dilute hydrochloric acid (50 ml.). The solid that precipitates is collected and dried, yield 3.75 g., M.P., gradual decomposition beyond 150° C. Recrystallization from acetonitrile gives (3-amino-5-methylamino-6-chloropyrazinoyl)cyanamide, M.P., >300° C.

Analysis.—Calc. for $C_7H_7ClN_6O$ (percent): C, 37.09; H, 3.11; N, 37.08. Found (percent): C, 37.35; H, 2.96; N, 36.96.

Employing the method substantially as described in Preparations 1A to 6A but substituting for the pyrazinoic esters used therein, equivalent quantities of the methyl 3-amino-5-R-6-$R^1$-pyrazinoates described in Table I, there are produced the (3-amino-5-R-6-$R^1$-pyrazinoyl)cyanamides, also described in Table I, according to the reaction scheme illustrated therein.

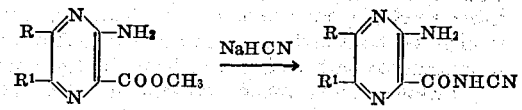

TABLE I

| Preparation | R | $R^1$ |
|---|---|---|
| 7A | $CH_3$— | Br— |
| 8A | $NH_2$— | I |
| 9A | $C_6H_5NH$— | Cl— |
| 10A | $NH_2$— | H— |
| 11A | $C_6H_5CH_2NH$— | H— |
| 12A | $CF_3$— | H— |
| 13A | $(CH_3)_2N$— | $CH_3$— |
| 14A | ⟨⟩— | H— |
| 15A | H | ⟨⟩ |
| 16A | H | ▷— |
| 17A | ⟨⟩— | Br— |

TABLE I.—Continued

| Preparation | R | R¹ |
|---|---|---|
| 18A | $(CH_3)_2N-$ | ⟨phenyl⟩- |
| 19A | | $-(CH_2)_4-$ |
| 20A | | $-CH=CH-CCl=CH-$ |
| 21A | $CH_3(CH_2)_2NH-$ | $Cl-$ |
| 22A | $(CH_3)_2CHNH-$ | $Cl-$ |
| 23A | $(CH_3)_3CHN-$ | $Cl-$ |
| 24A | ⟨cyclopropyl⟩$-CH_2NH-$ | $Cl-$ |
| 25A | ⟨cyclopropyl⟩$-NH-$ | $Cl-$ |
| 26A | ⟨cyclopentyl⟩$-HN-$ | $Cl-$ |
| 27A | ⟨phenyl⟩$-CH_2NH-$ | $Cl-$ |
| 28A | $CF_3CH_2CH_2NH-$ | $Cl-$ |
| 29A | $HO(CH_2)_2NH-$ | $Cl-$ |
| 30A | $H_2N(CH_2)_2NH-$ | $Cl-$ |
| 31A | $(CH_3)_2N(CH_2)_2NH-$ | $Cl-$ |
| 32A | (pyridyl)$-CH_2NH-$ | $Cl-$ |
| 33A | (furyl)$-CH_2NH-$ | $Cl-$ |
| 34A | $\begin{array}{c}CH_3\\ \diagdown\\ N-\\ \diagup\\ C_2H_5\end{array}$ | $Cl-$ |
| 35A | $\begin{array}{c}CH_2=CH-CH_2\\ \diagdown\\ N-\\ \diagup\\ C_2H_5\end{array}$ | $Cl-$ |
| 36A | (pyrrolidinyl)$N-$ | $Cl-$ |
| 37A | (piperidinyl)$N-$ | $Cl-$ |
| 38A | $CH_3-N\bigcirc N-$ | $Cl-$ |
| 39A | $\begin{array}{c}CH_3\\ \diagdown\\ N-\\ \diagup\\ H_2N\end{array}$ | |

(B) PREPARATION OF PYRAZINOYLTHIOUREAS

Example 1B (3,5-diamino-6-chloropyrazinoyl)thiourea.—A mixture of (3,5-diamino-6-chloropyrazinoyl)cyanamide (2.1 g., 0.01 mole), pyridine (25 ml.), and triethylamine (1.6 ml.) is warmed on steam for two and one-half hours while a steady stream of hydrogen sulfide gas is admitted below the surface of the solution. The warm reaction mixture is diluted with water (150 ml.), and the yellow solid that separates is collected and recrystallized from ethyl alcohol, yield 1.44 g., M.P. 242–244° C. (dec.). Further recrystallization from ethyl alcohol gives (3,5-diamino-6-chloropyrazinoyl)thiourea with MP. 243–245° C. (dec.).

Analysis.—Calc. for $C_6H_7ClN_6OS$ (percent): C, 29.21; H, 2.86; N, 34.07. Found (percent): C, 29.41; H, 3.16; N, 33.77.

Example 2B (3 - aminopyrazinoyl)thiourea.—A mixture of (3-aminopyrazinoyl)cyanamide (3.06 g., 0.02 mole), pyridine (25 ml.), and triethylamine (3.2 ml.) is heated on a steam bath for one and one-half hours while a steady stream of hydrogen sulfide gas is admitted below the surface of the mixture. The reaction mixture is cooled to room temperature, and poured into water (150 ml.). The dark yellow solid that separates is collected and dried, yield 1.8 g. (45%), M.P. 220–225° C. (dec.). Recrystallization from acetonitrile gives (3 - aminopyrazinoyl)thiourea melting at 223–225° C. dec.

Analysis.—Calc. for $C_6H_7N_5OS$ (percent): C, 36.54; H, 3.58; N, 35.51; S, 16.25. Found (percent): C, 36.83; H, 3.50; N, 35.54; S, 16.09.

Example 3B (3-amino-6-chloropyrazinoyl)thiourea.—A mixture of (3-amino-6-chloropyrazinoyl)cyanamide (1.98 g., 0.01 mole), pyridine (50 ml.), and triethylamine (1.6 ml.) is heated on a steam bath for one and one-half hours while a steady stream of hydrogen sulfide gas is admitted below the surface of the mixture. The reaction mixture is cooled to room temperature, and poured into water (200 ml.). The dark yellow solid that separates is collected and dried, yield 1.5 g. (64%), M.P. 250–255° C. (dec.). Recrystallization from nitromethane gives (3 - amino - 6-chloropyrazinoyl)thiourea melting at 254–255° C. (dec.).

Analysis.—Calc. for $C_6H_7ClN_6O_2$ (percent): C. 31.10; H, 2.61; N, 30.23; S, 13.84. Found (percent): C, 31.33; H, 2.70; N, 30.13; S, 13.88.

Example 4B (3-amino - 5 - dimethylamino - 6 - chloropyrazinoyl)-thiourea.—A steady stream of hydrogen sulfide gas is admitted below the surface of a solution of (3-amino-5-dimethylamino - 6 - chloropyrazinoyl)cyanamide (2.60 g., 0.011 mole), pyridine (10 ml.), and triethylamine (1.6 ml.) for two hours at room temperature followed by heating on the steam bath for one hour. The cooled mixture is diluted with water (50 ml.) and the yellow solid that separates is collected and dried, yield 2.53 g., M.P. 212–214° C. Recrystallization from ethyl alcohol gives (3-amino-5-dimethylamino-6-chloropyrazinoyl)thiourea with M.P. 214.5–216.5° C.

Analysis.—Calc. for $C_8H_{11}ClN_6OS$ (percent): C, 34.97; H, 4.04; N, 30.59; S, 11.67. Found (percent): C, 35.16; H, 3.95; N, 30.59; S, 11.45.

Employing the procedure of Example 4B, but substituting for the pyridine used as solvent, an equal volume of ethanol, the identical product is obtained.

Example 5B (3-amino-5-ethylamino-6-chloropyrazinoyl)thiourea.—A mixture of (3-amino-5-ethylamino-6-chloropyrazinoyl)cyanamide (4.82 g., 0.02 mole, pyridine (50 ml.) and triethylamine (3.2 ml.) is heated on a steam bath for three hours while a steady stream of hydrogen sulfide gas is admitted below the surface of the mixture. The reaction mixture is cooled to room temperature, and poured into water (250 ml.). The light orange solid that separates is collected and dried, yield 4.3 g. (80%), M.P. 240–243° C. (dec.). Recrystallization from absolute ethanol gives (3-amino-5-ethylamino-6-chloropyrazinoyl) thiourea melting at 244–245.5° C. (dec.).

Analysis.—Calc. for $C_8H_{11}ClN_6OS$ (percent): C, 34.97; H, 4.04; N, 30.59. Found (percent): C, 35.37; H, 4.22; N, 30.53.

Employing the procedure of Example 5B but substituting for pyridine and triethylamine used therein, equivalent volumes of dimethylformamide and trimethylamine, the identical product is obtained.

Employing the method of Examples 1B to 5B but substituting for the pyrazinoylcyanamides used therein, equivalent amounts of the 3-amino-5-R-6-R¹-pyrazinoylcyanamides described in Table II, there are produced the corresponding 3-amino-5-R-6-R¹-pyrazinoylthioureas also described in Table II according to the reaction scheme illustrated therein.

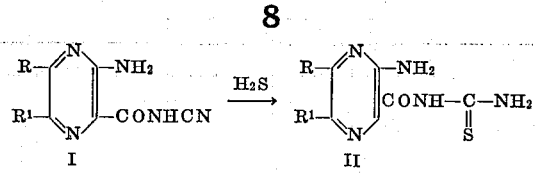

| Example | Starting material from preparation | R | R¹ |
|---|---|---|---|
| 6B | 6A | CH₃NH— | Cl— |
| 7B | 7A | CH₃— | Br— |
| 8B | 8A | NH₂— | I— |
| 9B | 9A | C₆H₅NH— | Cl— |
| 10B | 10A | NH₂— | H— |
| 11B | 11A | C₆H₅CH₂NH— | H— |
| 12B | 12A | CF₃— | H— |
| 13B | 13A | (CH₃)₂N— | CH₃— |
| 14B | 14A | ⌬— (cyclohexyl) | H— |
| 15B | 15A | H | ⌬— (cyclohexyl) |
| 16B | 16A | H | ▷— (cyclopropyl) |
| 17B | 17A | ⌬— (phenyl) | Br— |
| 18B | 18A | (CH₃)₂N— | ⌬— (phenyl) |
| 19B | 19A |  | —(CH₂)₄— |
| 20B | 20A |  | —CH=CH—CCl=CH— |
| 21B | 21A | CH₃(CH₂)₂NH— | Cl— |
| 22B | 22A | (CH₃)₂CHNH— | Cl— |
| 23B | 23A | (CH₃)₃CNH— | Cl— |
| 24B | 24A | ▷—CH₂NH— | Cl— |
| 25B | 25A | ▷—NH— | Cl— |
| 26B | 26A | ⬠—NH— (cyclopentyl) | Cl— |
| 27B | 27A | ⌬—CH₂NH— (benzyl) | Cl— |
| 28B | 28A | CF₃CH₂CH₂NH— | Cl— |
| 29B | 29A | HO(CH₂)₂NH— | Cl— |
| 30B | 30A | H₂N(CH₂)₂NH— | Cl— |
| 31B | 31A | (CH₃)₂N(CH₂)₂NH— | Cl— |
| 32B | 32A | pyridyl-CH₂NH— | Cl— |
| 33B | 33A | furyl-CH₂NH— | Cl— |
| 34B | 34A | CH₃(C₂H₅)N— | Cl— |
| 35B | 35A | (CH₂=CH—CH₂)(C₂H₅)N— | Cl— |
| 36B | 36A | pyrrolidinyl-N— | Cl— |
| 37B | 37A | piperidinyl-N— | Cl— |

| Example | Starting material from preparation | R | R¹ |
|---------|-----------------------------------|---|-----|
| 38B | 38A | 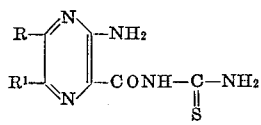 | Cl— |
| 39B | 39A | 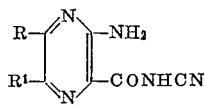 | Cl— |

FORMULATION 1

Dry filled capsule containing 50 mg. of active ingredient

| | Per capsule, mg. |
|---|---|
| (3,5-diamino-6-chloropyrazinoyl)thiourea | 50 |
| Lactose | 273 |
| Magnesium stearate | 2 |
| Mixed powders | 325 |

Mix the (3,5-diamino - 6 - chloropyrazinoyl)thiourea from Example 1B, lactose and magnesium stearate and reduce to a No. 60 mesh powder. Encapsulate, filling 325 mg. in each No. 2 capsule.

What is claimed is:

1. A process for the preparation of (3-amino-5-R-6-R¹-pyrazinoyl)thiourea of formula

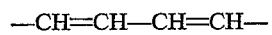

wherein R is a member selected from the group consisting of
(1) hydrogen,
(2) trifluromethyl,
(3) $C_{3-6}$ cycloalkyl,
(4) phenyl,
(5) lower alkyl,
(6) —$NR^3R^4$ wherein $R^3$ is a member selected from the group consisting of
   (a) hydrogen, and
   (b) lower alkyl;
$R^4$ is a member selected from the group consisting of
   (a) hydrogen,
   (b) amino,
   (c) $C_{3-6}$ cycloalkyl,
   (d) phenyl,
   (e) lower alkenyl,
   (f) lower alkyl,
   (g) hydroxy-lower alkyl,
   (h) amino-lower alkyl,
   (i) di(lower alkyl)amino-lower alkyl,
   (j) halo-lower alkyl,
   (k) phenyl-lower alkyl,
   (l) $C_{3-6}$ cycloalkyl lower alkyl,
   (m) pyridyl-lower alkyl, and
   (n) furyl-lower alkyl, and when $R^3$ and $R^4$ each represent lower alkyl, they can be linked together directly to form a 5 to 7 membered heterocyclic ring with the nitrogen to which they are attached, and when $R^3$ and $R^4$ each represents lower alkyl, they can be linked together through a nitrogen atom to form a piperazine ring with the nitrogen atom to which are attached;

$R^1$ is a member selected from the group consisting of
(1) hydrogen,
(2) halo,
(3) lower alkyl,
(4) $C_{3-6}$ cycloalkyl, and
(5) phenyl;

R and $R^1$ can be linked together to form a member selected from the group consisting of

—CH=CH—CH=CH—

—CH=CH—CCl=CH— and —$(CH_2)_4$— which comprises the treatment of a (3-amino-5-R-6-—$R^1$-pyrazinoyl) cyanamide of formula in an inert solvent with hydrogen sulfide in the presence of a tri(lower alkyl)amine.

2. The process as claimed in claim 1, wherein the solvent is pyridine.

3. The process as claimed in claim 1, wherein the solvent is pyridine and the tri(lower alkyl)amine is triethylamine.

4. The process as claimed in claim 1, wherein R is hydrogen and $R^1$ is chloro to yield (3-amino-6-chloropyrazinoyl)thiourea.

5. The process as claimed in claim 1 wherein R is —$NR^3R^4$, and $R^1$ is chloro to yield (3-amino-5-$NR^3R^4$-6-chloropyrazinoyl)thiourea wherein $R^3$ and $R^4$ have the meaning assigned in claim 1.

6. The process as claimed in claim 5 wherein $R^3$ and $R^4$ are both hydrogen to yield (3,5-diamino-6-chloropyrazinoyl)thiourea.

7. The process as claimed in claim 5 wherein $R^3$ is hydrogen, and $R^4$ is lower alkyl, to yield (3-amino-5-lower alkylamino-6-chloropyrazinoyl)thiourea.

8. The process as claimed in claim 5, wherein $R^3$ is hydrogen and $R^4$ is methyl, to yield (3-amino-5-methylamino-6-chloropyrazinoyl)thiourea.

9. The process as claimed in claim 5, wherein $R^3$ is hydrogen and $R^4$ is ethyl, to yield (3-amino-5-ethylamino-6-chloropyrazinoyl)thiourea.

10. The process as claimed in claim 5 wherein $R^3$ and $R^4$ are lower alkyl to yield [3-amino-5-di(lower alkyl)-amino-6-chloropyrazinoyl]thiourea.

11. The process as claimed in claim 5 wherein $R^3$ and $R^4$ are each methyl to yield (3-amino-5-dimethylamino-6-chloropyrazinoyl)thiourea.

References Cited

UNITED STATES PATENTS 3,345,372   10/1967   Hanifin et al. _____ 260—250

NICHOLAS S. RIZZO, Primary Examiner

UNITED STATES PATENT OFFICE
CERTIFICATE OF CORRECTION

Patent No. 3,544,571               Dated December 1, 1970

Inventor(s) Edward J. Cragoe, Jr. and Kenneth L. Shepard

It is certified that error appears in the above-identified patent and that said Letters Patent are hereby corrected as shown below:

In column 2, line 25, correct structure I to appear as follows:

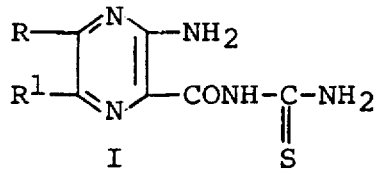

In column 2, line 55, in structure II, correct "$R^2$" to read ---$R^1$---. In column 4, line 8, immediately preceding "3-ami: add an opening parenthesis ---(---; line 61 in Table I, in t] "$R^1$" column under Preparation 8A, change "I" to read --- I- In column 5, Table I, delete the first reference to "32A"; i: the "$R^1$" column of Preparation 39A, add --- Cl- ---. In col umn 8, immediately preceding structures I and II, add ---TABLE II---; correct structure II to appear as follows:

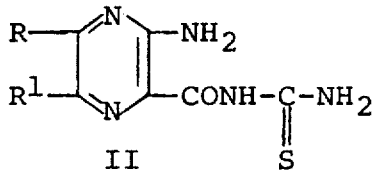

in the "$R^1$" column of Example 18B, correct

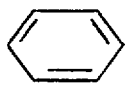 to read 

Signed and sealed this 17th day of August 1971.

(SEAL)
Attest:

EDWARD M. FLETCHER, JR.                WILLIAM E. SCHUYLER, JR.
Attesting Officer                      Commissioner of Patents